US011565177B2

(12) United States Patent
Colenbrander

(10) Patent No.: US 11,565,177 B2
(45) Date of Patent: Jan. 31, 2023

(54) EDGE COMPUTE PROXY FOR CLOUD GAMING AND 5G

(71) Applicant: Sony Interactive Entertainment Inc., Tokyo (JP)

(72) Inventor: Roelof Roderick Colenbrander, Costa Mesa, CA (US)

(73) Assignee: Sony Interactive Entertainment Inc., Tokyo (JP)

(*) Notice: Subject to any disclaimer, the term of this patent is extended or adjusted under 35 U.S.C. 154(b) by 84 days.

(21) Appl. No.: 16/676,124

(22) Filed: Nov. 6, 2019

(65) Prior Publication Data
US 2021/0129019 A1   May 6, 2021

(51) Int. Cl.
*A63F 13/355* (2014.01)
(52) U.S. Cl.
CPC .................................. *A63F 13/355* (2014.09)
(58) Field of Classification Search
CPC .................................................... A63F 13/355
See application file for complete search history.

(56) References Cited

U.S. PATENT DOCUMENTS

| 2015/0092661 | A1* | 4/2015 | Huang | H04W 40/248 370/315 |
| 2016/0142932 | A1* | 5/2016 | Ahmadzadeh | H04W 28/0278 370/328 |
| 2017/0230147 | A1* | 8/2017 | Kroener | H04L 5/0055 |
| 2017/0312626 | A1* | 11/2017 | Colenbrander | A63F 13/35 |
| 2019/0306166 | A1* | 10/2019 | Konda | H04L 63/0428 |
| 2019/0339840 | A1* | 11/2019 | Park | G06F 3/04815 |

OTHER PUBLICATIONS

IISR & Written Opinion PCT/US2020/059527, dated Feb. 15, 2021, 12 pages.
Andrew Machen et al., "Live Service Migration in Mobile Edge Clouds", arxiv.org, Cornell University Library, 201 Olin Library Cornell University Ithaca, NY 14853, Jun. 13, 2017 (Jun. 13, 2017), XP081400418, DOI: 10.1109/MCW.2017.170011.
Chakareski J et al, "Rate-Distortion Optimized Streaming from the Edge of the Network", Proceedings of the 2003 IEEE RADAR Conference, Huntsville, AL, May 5-8, 2003; [IEEE Radar Conference], New York, NY: IEEE, US, Dec. 9, 2002 (Dec. 9, 2002), pp. 49-52, XP010642511, ISBN: 978-0-7803-7920-6 * section III, channel 2 *.
Jiayi Liu et al., "Migration-Based Dynamic and Practical Virtual Streaming Agent Placement for Mobile Adaptive Live Streaming", IEEE Transactions on Network and Service Management, vol. 15, No. 2, Jun. 1, 2018 (Jun. 1, 2018), pp. 503-515, XP055769185, US ISSN: 1932-4537, DOI: 10.1109/TNSM.2017.2740432.

(Continued)

*Primary Examiner* — Thomas H Henry
(74) *Attorney, Agent, or Firm* — Penilla IP, APC

(57) ABSTRACT

A method is provided, including the following operations: executing a cloud video game in a data center; streaming video generated by the executing cloud video game over a network to a client device; deploying a cloud gaming proxy to an edge compute that is proximate to the client device; wherein the cloud gaming proxy buffers the video and retransmits lost packets of the video to the client device.

22 Claims, 8 Drawing Sheets

(56) References Cited

OTHER PUBLICATIONS

M.J. Prins et al., "Fast RTP Retransmission for IPTV—Implementation and Evaluation", 2014 IEEE Global Communications Conference, Nov. 1, 2008 (Nov. 1, 2008), pp. 1-6, XP055770278, ISSN: 1930-529X, DOI: 10.1109/GLOCOM.2008.ECP.444.

Yoshimura T et al, "Rate and Robustnee Control with RTP Monitoring Agent for Mobile Multimedia Streaming", Proceedings of IEEE International Conference on Communications—Apr. 28-May 2, 2002—New Yrok, NY, USA, IEEE, Piscataway, NJ, USA, vol. 4, Apr. 28, 2002 (Apr. 28, 2002), pp. 2513-2517, XP010589933, DOI: 10.1109/ICC.2002.997295 ISBN: 978-0-7803-7400-3.

\* cited by examiner

EDGE COMPUTE PROXY FOR CLOUD GAMING AND 5G

FIELD OF THE DISCLOSURE

The present disclosure relates to systems and methods for an edge compute proxy for cloud gaming and 5G network communications.

BACKGROUND

Description of the Related Art

A current trend in the gaming industry is a move towards cloud gaming. Cloud gaming provides advantages to the end user by enabling remote execution of a video game in a data center where the resources for the video game can be guaranteed. The video generated by the remotely executed video game is streamed to the user's equipment, and inputs from the user are sent back to the data center. This frees the end user from the need to own specific hardware in order to execute the game itself. Rather, the end user need only possess sufficient hardware to stream the gameplay, and may still enjoy a high quality gaming experience. Furthermore, in theory, cloud gaming enables gaming from any location where network connectivity is available.

To enable portability and freedom of location, game streaming over wireless networks is desirable. However, wireless network communications can be problematic. For example, WiFi connections can be unreliable, as there may be interference, or others using the same WiFi frequencies or channels. Or the user may be too far away from the wireless networking equipment to receive a strong signal. With the current rollout of 5G cellular networks, such problems may become even more noticeable, as there may be many more users accessing the same base stations.

It is within this context that embodiments of the disclosure arise.

SUMMARY OF THE DISCLOSURE

Implementations of the present disclosure provide methods and systems for an edge compute proxy for cloud gaming and 5G network communications.

In some implementations, a method is provided, including the following operations: executing a cloud video game in a data center; streaming video generated by the executing cloud video game over a network to a client device; deploying a cloud gaming proxy to an edge compute that is proximate to the client device; wherein the cloud gaming proxy buffers the video and retransmits lost packets of the video to the client device.

In some implementations, streaming the video, buffering the video, and retransmission of lost packets are performed in real-time.

In some implementations, the retransmission of a given lost packet is in response to non-receipt of an acknowledgement, for the given lost packet from the client device, within a predefined time period after prior transmission of the lost packet.

In some implementations, the retransmission of a given lost packet is in response to a request for the given lost packet from the client device.

In some implementations, the edge compute is defined at a wireless base station that facilitates wireless communication with the client device.

In some implementations, the wireless base station is a member of a cellular network.

In some implementations, the method further includes: deploying a second cloud gaming proxy to a second edge compute that is defined at a second wireless base station proximate to the wireless base station, the second cloud gaming proxy receiving and buffering the video; responsive to detecting switching of the client device from the wireless base station to the second wireless base station, then activating the second cloud gaming proxy to retransmit lost packets of the video to the client device.

In some implementations, the buffering of the video by the second cloud gaming proxy occurs simultaneously with the buffering of the video by the cloud gaming proxy prior to the switching of the client device from the wireless base station to the second wireless base station.

In some implementations, the cloud gaming proxy tracks video frames of the video, and does not retransmit lost packets for a given video frame after a predefined time period has elapsed since the given video frame was transmitted to the client device.

In some implementations, the method further includes: streaming audio generated by the executing cloud video game over the network to the client device; wherein the cloud gaming proxy buffers the audio and retransmits lost packets of the audio to the client device.

In some implementations, a non-transitory computer readable medium is provided having program instructions that, when executed by a computing device, cause said computing device to perform a method including the following: executing a cloud video game in a data center; streaming video generated by the executing cloud video game over a network to a client device; deploying a cloud gaming proxy to an edge compute that is proximate to the client device; wherein the cloud gaming proxy buffers the video and retransmits lost packets of the video to the client device.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure, together with further advantages thereof, may best be understood by reference to the following description taken in conjunction with the accompanying drawings.

DETAILED DESCRIPTION

Figure 1:
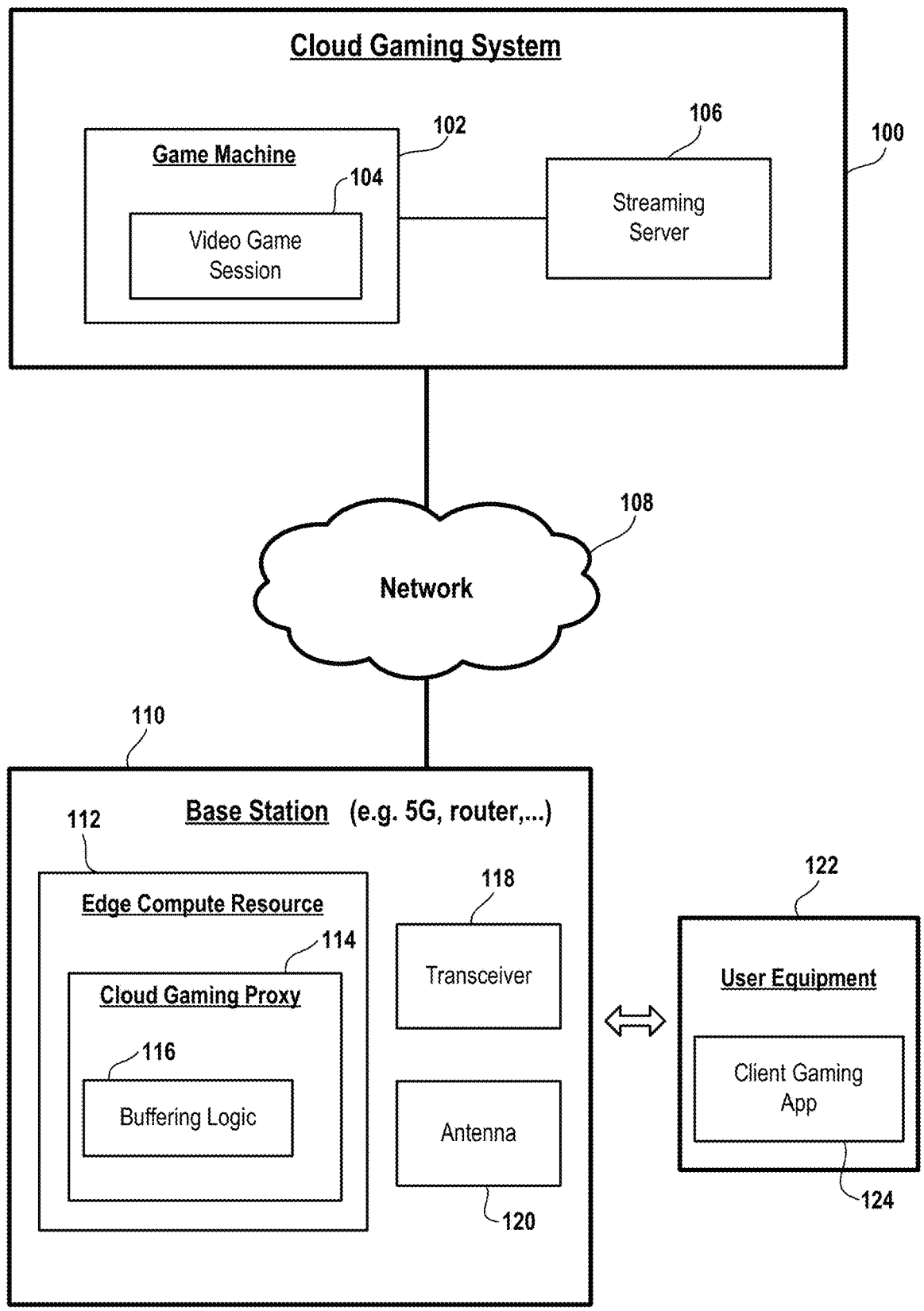
FIG. 1 conceptually illustrates a system for streaming a cloud video game to a client, in accordance with implementations of the disclosure.

In the following description, numerous specific details are set forth in order to provide a thorough understanding of the present disclosure. It will be apparent, however, to one skilled in the art that the present disclosure may be practiced without some or all of these specific details. In other instances, well known process steps have not been described in detail in order not to obscure the present disclosure.

Broadly speaking implementations of the present disclosure are drawn to an interactive virtual/augmented character that is viewable through a head-mounted display. In several implementations the virtual character is configured to move between a scene that is rendered on a display device in a local environment, and the local environment itself as seen through a head-mounted display. In some implementations the virtual character is capable of interacting with smart devices or IOT devices, such as by controlling them to turn on or off or perform other functions. In still other implementations, various techniques are employed to enable the virtual character's presence to be comprehended by other users in the local environment that are not able to see the virtual character through a head-mounted display. For example, audio of the virtual character, such as the virtual characters voice, can be rendered through local speaker systems.

Broadly speaking, cloud gaming functions by streaming from a data center to a client device over the Internet. However, packet loss can result in audio/video artifacts at the client side when using a non-error checked protocol such as UDP networking. On the other hand, if using an error-checked protocol such as TCP, and retransmissions are needed, then this comes at the cost of added latency as additional time is required for retransmission of packets. Another strategy for addressing packet loss is through the use of forward error correction (FEC). However, FEC requires additional data to be sent, which consumes bandwidth.

However, a large portion of packet loss occurs close to the user, such as over their WiFi connection at home or their LTE or 5G wireless connection. With the emergence of 5G wireless technology, there is also greater availability of edge compute resources, which bring compute to the cell tower (or close to it). Implementations of the present disclosure employ a cloud gaming proxy over edge compute resources to achieve a more stable and more reliable video stream.

5G cell towers are typically connected through fiber optic lines to the Internet, and hence their connectivity is generally quite fast and reliable. However, it is the last leg from edge to client, which is most likely to be unreliable. In case of packet loss in cloud gaming applications, currently data needs to be retransmitted from the data center, which is most likely far away, both in terms of distance and latency. However, implementations of the present disclosure provide a cloud gaming proxy deployed at the edge compute servers, which function to buffer any network packets between client and data center.

In cloud gaming applications, most of the data is transmitted from the data center (e.g. audio/video data) to the client. A cloud gaming proxy can deal with potential retransmits, where needed, back to the client. In particular in a 5G wireless application, it is possible to have ~1 ms ping time to the cell tower and edge compute. Whereas ping times to the data center are often about 30 ms or more. However, by using a cloud gaming proxy deployed at the edge to perform retransmits, image quality at the client side can be significantly improved along with latency as retransmits become significantly faster (e.g. on the order of 1 ms).

FIG. 1 conceptually illustrates a system for streaming a cloud video game to a client, in accordance with implementations of the disclosure. In the Illustrated implementation, a cloud gaming system 100 is configured to execute a video game for remote gameplay by a user. The cloud gaming system 100 can be implemented in a data center over various hardware such as one or more server computers. As shown, the cloud gaming system 100 includes a game machine 102 that is configured to execute a session of the video game 104. The game machine 102 can be a general or special purpose computer, a gaming console, a bladed version of a gaming console, a virtual machine, or any other computing resource capable of providing the operating system environment or platform upon which the session of the video game 104 is executed. In some implementations, the game machine 102 is a virtual machine that executes over a hypervisor or cloud compute resource in a data center. It will be appreciated that as the video game session is executed, inputs to the video game are processed, and gameplay video, including both image data and audio data, is output for rendering at a client device.

In the illustrated implementation, user equipment 122 is a client device that receives over the network 108 the video generated from the execution of the video game session 104, and renders the video for viewing by the user. Merely by way of example without limitation, the user equipment 122 can be a personal computer, a laptop computer, a tablet, a cellular phone, a portable gaming device, a set-top box, a game console, a smart display, a streaming stick or box, or any other device capable of receiving and rendering the video of the video game for viewing by the user. It will be appreciated that the user equipment 122 may include the display upon which the video is rendered for viewing in some implementations, or may be operatively connected to such a display. User equipment 122 may execute a client gaming application 124 that is configured to communicate with the cloud gaming system 100 in order to stream the video game play therefrom, including receiving and rendering the video output by the executing video game and facilitating interactive gameplay of the video game by the user using the user equipment 122, and receiving and transmitting inputs from the gameplay over the network 108 back to the executing video game session 104. Such inputs can be generated from user operation of input devices that supply interactive input, which may be integrated into or separate from the user equipment 122, such as a touchscreen, joysticks, buttons, motion sensing hardware (e.g. accelerometers, gyroscopes, magnetometers, etc.), camera, microphone, etc.

As has been noted, video generated from the execution of the video game session 104 is streamed over the network 108 to the user equipment 122 for rendering. In some implementations, a streaming server 106 handles the streaming of the video, and/or may further process the video prior to transmission to the user equipment 122. By way of example without limitation, the streaming server 106 can adjust the video quality such as its bitrate based on network conditions, transcode the video into a suitable format, upscale or downscale the video, or perform other adjustments as necessary to optimize the video quality for the user equipment 122.

Broadly speaking, implementations of the disclosure contemplate that the user equipment 122 accesses a wireless data connection in order to stream gameplay from the cloud gaming system 100. That is, the last hop or near the last hop from the cloud gaming system to the user equipment 122 is over a wireless network. By way of example, the user equipment 122 may be a cellular device that connects to a cellular data network. Or in other implementations, the user equipment 122 connects to a local wireless network such as a Wi-Fi network. Thus, the wireless network over which user equipment 122 receives and transmits data, lies at or near the edge of the network topology between the cloud gaming system 100 (typically in a remote data center) and the user equipment 122.

As shown in the illustrated implementation, a wireless base station 110 provides a wireless network connection to enable wireless transmission of data. In some implementations, the wireless base station 110 is a cellular base station, providing a cellular network connection such as a 4G or 5G cellular network. In other implementations, the wireless base station 110 is a wireless router or other wireless networking device. For ease of description, wireless base station 110 is shown separate from the network 108. However, wireless base station 110 can be considered to be part of the network 108 specifically situated at the edge of the network 108 that facilitates communication between the cloud gaming system 100 and the user equipment 122. As shown, the wireless base station 110 includes a transceiver 118, and an antenna 120.

Thus in the illustrated implementation, video generated from the video game session 104 is transmitted via the base station 110 over a wireless connection to the user equipment 122 for presentation through a display and speakers. As video data or other data related to the video game is transmitted to the user equipment 122, in the case of data loss or packet loss existing systems require such data or packets to be retransmitted from the cloud gaming system 100. This requires communication all the way back through the network 108 to the cloud gaming system 100 (or data center) followed by retransmission again over the network to the user equipment 122. The amount of time required for such retransmission can be prohibitively long, and may not be feasible for providing high quality video for a real-time gaming environment. For example, retransmits might not be possible with a high frame rate video because the time required to communicate back and forth with the cloud gaming system 100 exceeds the time to the presentation of the next frame at the client.

To address such issues, a cloud gaming proxy 114 is provided at the edge to handle retransmits as needed. The cloud gaming proxy is situated at or substantially near the wireless base station 110 so as to be close to the user equipment 122. In this manner, retransmission of data or packets need not require communication all the way back to the cloud gaming system's data center, but only back to the wireless base station 110. Cloud gaming proxy 114 includes buffering logic 116, which is configured to buffer the video or data packets and/or other data generated from the video game session 104 that is transmitted to the client. Then in the case of packet loss such that portions of the data need to be retransmitted to the user equipment 122, then such data packets can be retrieved from the buffer and retransmitted by the cloud gaming proxy to the user equipment 122, which is very fast as the cloud gaming proxy 114 is situated at or near the base station 110 and therefore proximate to the user equipment 122 within the overall network topology. The majority of data transmitted to the user equipment 122 is typically for the gameplay video, and by buffering the gameplay video at the edge of the network proximate to the user equipment 122, even if the wireless connection incurs data or packet loss, such data/packets can be retransmitted in a very fast manner so as to minimally impact latency of the video game while enabling high fidelity video presentation to be maintained.

In some implementations, the cloud gaming proxy 114 acts as a waypoint, such that gameplay video is streamed to the cloud gaming proxy 114, and the cloud gaming proxy 114 in turn buffers and transmits the gameplay video to the user equipment 122.

In another implementation, the cloud gaming proxy 114 intercepts and buffers the data packets of gameplay video which are addressed to the user equipment. In such an implementation, the cloud gaming proxy 114 also intercepts acknowledgements from the user equipment as described in further detail below. In this manner, the cloud gaming proxy 114 is transparent to the user equipment, while speeding up packet retransmission.

The cloud gaming proxy 114 can be implemented over an edge compute resource 112. Broadly speaking, the edge compute resource 112 is an available processing resource for executing programs or applications at or near the base station 110. In some implementations, the edge compute resource is implemented as an edge compute server or edge node that is accessible for deployment of programs/applications at the base station 110. In some implementations, the edge compute resource is a mobile edge computing or multi-access edge computing (MEC) application server that provides computing and storage resources, and may further provide access to real-time radio access network (RAN) information.

It will be appreciated that the communication between the user equipment 122 and the cloud gaming proxy 114 can utilize a standard protocol (e.g. UDP, TCP/IP, etc.) or a non-standard or custom protocol.

Figure 2:
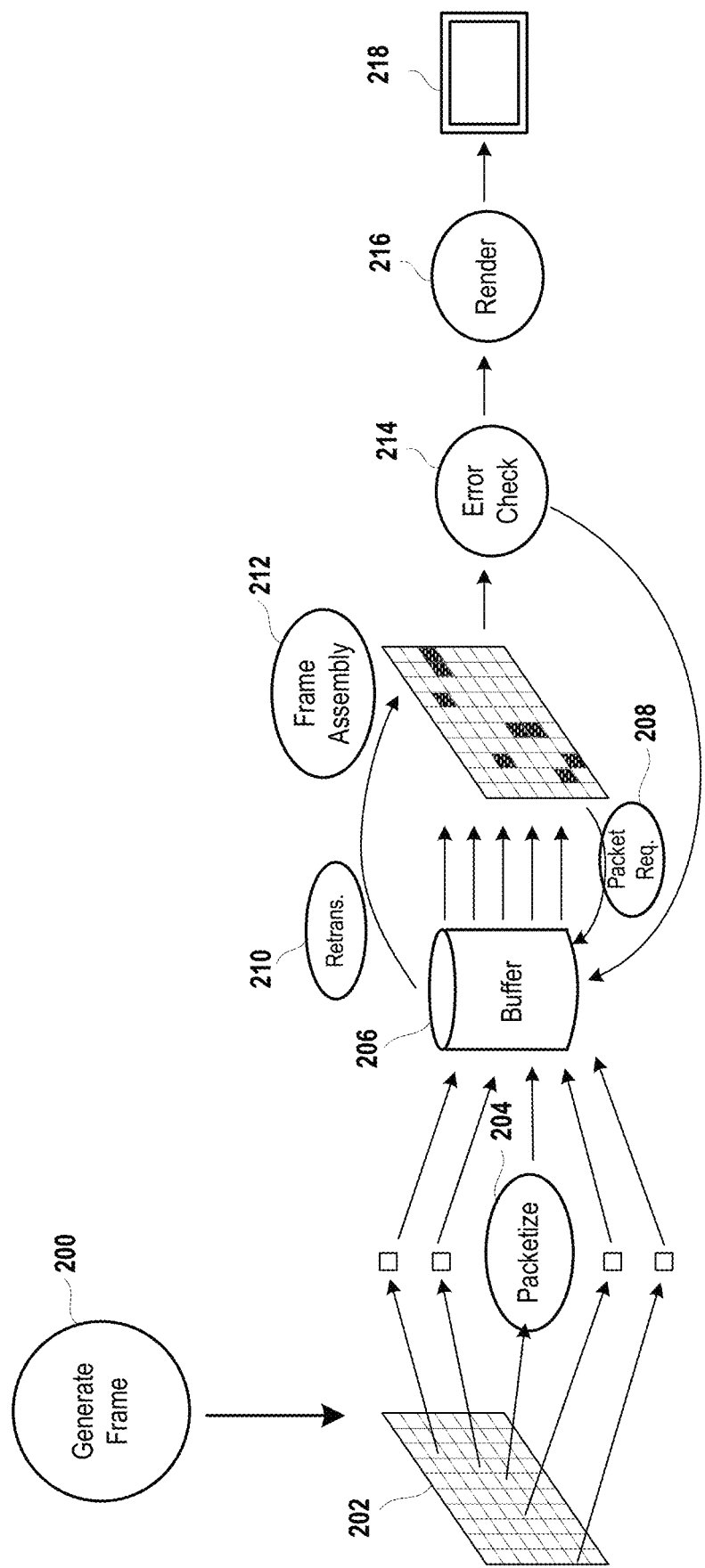
FIG. 2 conceptually illustrates a process for retransmission of data in cloud game streaming, in accordance with implementations of the disclosure.

FIG. 2 conceptually illustrates a process for retransmission of data in cloud game streaming, in accordance with implementations of the disclosure. The executing cloud video game continually generates video frames, as indicated at reference 200. By way of example without limitation, a representative video frame 202 is shown in the illustrated implementation. The video frame 202 data (which can be encoded according to a video codec/format or video compression protocol) is packetized (reference 204) for transport over the network (e.g. the Internet). The data packets are transported to the cloud gaming proxy at the edge of the network, which buffers the data packets as they are being transmitted to the client, storing them to a buffer 206. A frame assembly process 212 is performed at the client, whereby the packets that define video frame 202 are unpacked and assembled (and optionally decoded) to enable replication of the video frame 202 at the client. Ideally, the packets received at the client include all the data for the video frame and arrive on time, so as to enable rendering 216 of the video frame to the display 218 in a manner that faithfully reproduces the original video frame 202.

However, packet loss can occur from the base station at the edge to the client, and thus, as described herein, packet retransmission can occur at the edge so as to minimize the amount of time required for retransmits. In the case of a positive acknowledgment error-checked communication protocol, such as TCP/IP, the packets are checked upon receipt at the client, and a positive acknowledgement is sent for packets that are received without error. Typically, such a positive acknowledgement must be sent all the way back to the originating data center, and a non-acknowledged packet is automatically retransmitted after a given time period. However, in accordance with implementations of the disclosure, the positive acknowledgement is sent to the cloud gaming proxy 114, and the cloud gaming proxy can thus be configured to automatically retransmit a given packet (ref. 210) that has not been positively acknowledged after a given time period (e.g. approximately an expected time for transmission of a packet and receipt of a corresponding positive acknowledgement).

In some implementations, a negative acknowledgement framework is used, such that if an error is detected or an expected packet is not received by the client within an expected time frame, then a negative acknowledgement is sent for the relevant packet. This functions as a request (ref. 208) for retransmission of the relevant packet from the cloud gaming proxy, and the desired packet is retransmitted (ref. 210) from the buffer 206. As noted, this does not require communication all the way back to the cloud gaming system, but is handled at the edge of the network, making the round trip time very fast.

Generally speaking, to provide a quality video streaming experience, then the rendering of video frames at the client should be "on time," that is, in accordance with their expected timing in the sequence of video frames that define the gameplay video. For example, if video frames are generated at a rate of 60 frames per second (fps), then the rendering of such video frames at the client should also occur at 60 fps, but at some delay/offset relative to the original video frame generation. And even if the frame rate should change from moment to moment (variable frame rate), then the timing of the rendering of such video frames at the client should match these changes, so that video frames are rendered according to their original timing, only with a necessary delay due to the time needed to stream the video over the network to the client. Put another way, the delay from the cloud gaming system to the client should be consistent to ensure smooth video rendering at the client that matches the timing of the video frame generation at the cloud gaming system.

Thus, in some implementations, the timing of the given frame to which a packet pertains is taken into account before deciding whether to retransmit a lost packet from the cloud gaming proxy (in accordance with a positive acknowledgement framework), or request retransmission of a given packet by the client (in accordance with a negative acknowledgement framework). If a packet is lost or erroneous in some way, but there is insufficient time for retransmission prior to rendering of the frame to which the packet pertains, then the packet is not retransmitted by the cloud gaming proxy, or no request for packet retransmission is sent by the client. Whereas if there is sufficient time, then the packet is retransmitted by the cloud gaming proxy or the request for retransmission 208 is sent from the client. It will be appreciated that determining whether there is sufficient time can be based on a predefined amount of time or a time cutoff. For example, if the time to rendering of the video frame is less than a predefined amount of time, then a retransmission of, or a packet retransmit request for, a packet related to that video frame is not sent, whereas otherwise the packet is retransmitted or the retransmit request is sent.

Accordingly, in some implementations, the packet headers identify to which video frame the data in the packet pertains, and possibly the timing of the video frame. Such information is then used to enable determination of whether to execute a packet retransmission or a request for packet retransmission, as described above. For example, in some implementations for a positive acknowledgement framework, the cloud gaming proxy tracks the timing and sequence of video frames as they are continually received from the data center, so that retransmission of packets for a given video frame are stopped after a predefined amount of time has elapsed since the video frame was first transmitted to the client. It will be appreciated that the predefined amount of time can be based on an expected time of rendering of the video frame at the client.

In some implementations, a non-error checked communication protocol (e.g. UDP) is used to transmit the packets over the network. In such cases, the packets can include frame identifier information, but it may not be determined whether packets have been lost until the video frame is assembled from the available packets that have been received, or an accounting/inventory of packets received for the video frame is performed at a given point in time (e.g. at a predefined interval). Thus, in some implementations, error checking process 214 is performed, which may be based on or part of the frame assembly process 212, to determine whether data is missing from a given video frame, and if so, then a request for such data is sent back to the cloud gaming proxy, and the relevant data is retrieved from the buffer 206 and retransmitted to the client. It will be appreciated that the timing of frame rendering at the client can be applied to determine whether to request data for a given video frame, similar to that described above. In other words, requests for retransmission of data may or may not be sent depending upon whether there is sufficient time before the rendering of the video frame at the client.

In some implementations, portions of a video frame that are missing pixel data could be filled in at the client using a graphical fill technology. For example, such a graphical fill technology could be an AI (artificial intelligence) based graphics generation or upscaling technology, which can use AI to generate or adjust graphics based on existing graphical context.

It will be appreciated that the buffering of video for cloud gaming as provided by the presently described cloud gaming proxy is to be distinguished from existing systems that cache or buffer pre-existing content at the edge of a network. For pre-existing content such as movies, music, or webpages can be cached well in advance of their retrieval, or even upon request. Even "live streamed" content can be delivered with significant delays (e.g. greater than 500 ms to several seconds) without impacting the user experience. However, cloud gaming video content that is generated in real-time must be streamed in real-time in order to provide a quality gaming experience. In various implementations, real-time video delivery can be defined as having a duration or latency, from video frame rendering by the executing video game at the data center to video frame presentation by the client device, of less than about 200 ms, less than about 150 ms, less than about 100 ms, less than about 50 ms, less than about 30 ms, etc. Thus, the cloud gaming proxy of the present implementations buffers streaming gameplay video in real-time, enhancing real-time video delivery and gameplay.

Figure 3:
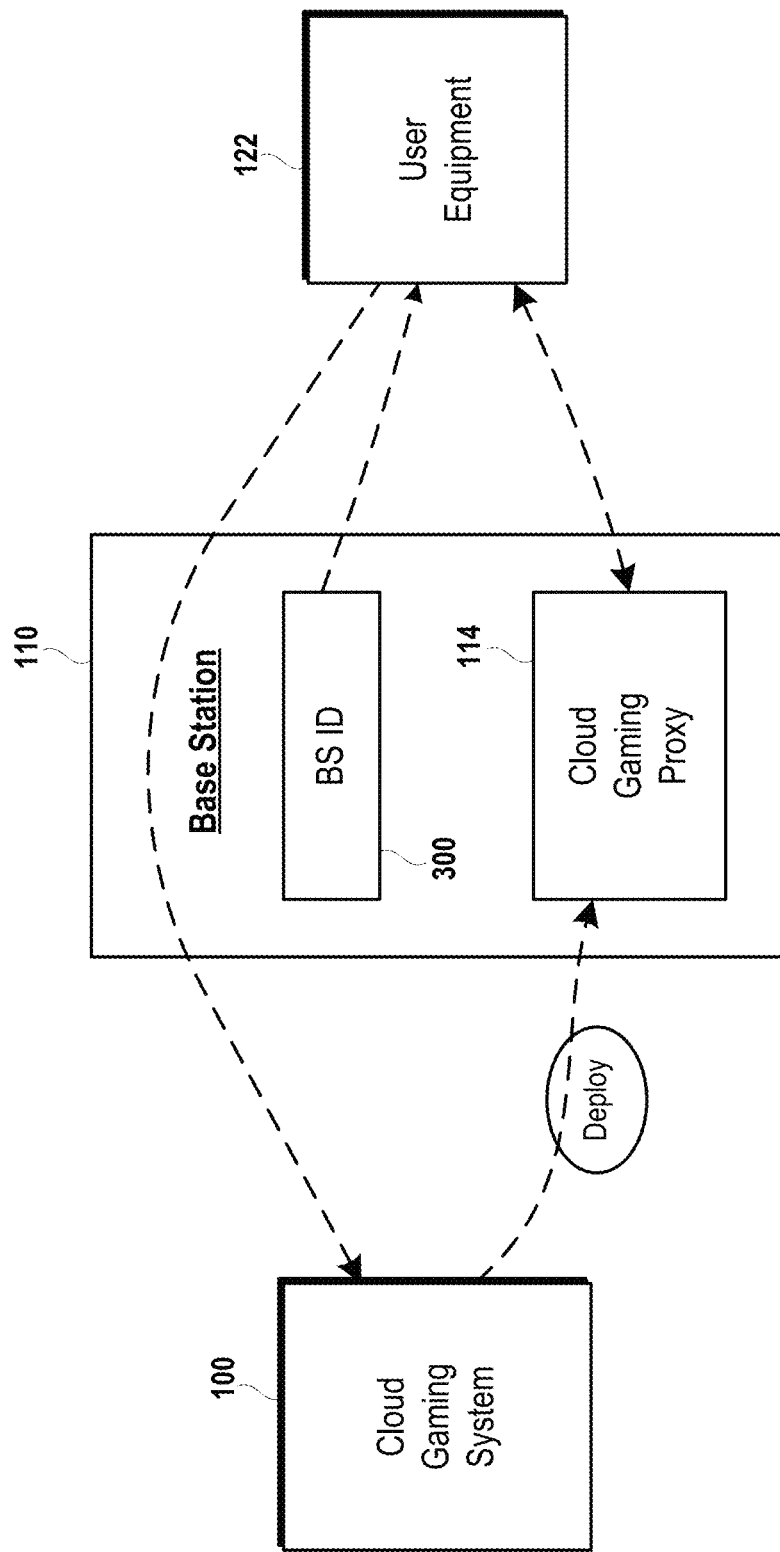
FIG. 3 conceptually illustrates a pairing process for deployment of a cloud gaming proxy, in accordance with implementations of the disclosure.

FIG. 3 conceptually illustrates a pairing process for deployment of a cloud gaming proxy, in accordance with implementations of the disclosure. Broadly speaking, the cloud gaming system identifies the base station to which the user equipment is connected, so as to determine where to deploy the cloud gaming proxy. In the illustrated implementation, the base station 110 has a base station identifier 300, which is a unique identifier associated to the base station 110. In some implementations, the base station identifier 300 can be a base station identity code, GSM cell ID, IP address, fully qualified domain name (fqdn) or some other form of identifying information that is uniquely assigned to the base station 110.

The user equipment 122 is able to access the base station identifier 300 as it is connected to the base station 110. When a cloud gaming session is initiated, the user equipment 122 transmits the base station identifier 300 to the cloud gaming system 100. The cloud gaming system 100 then uses the base station identifier 300 to identify the base station 110, and further deploys the cloud gaming proxy 114 at the base station 110. In this way, the cloud gaming system 100 is able to deploy the cloud gaming proxy 114 at the base station 110 that is being used by the user equipment 122.

In some implementations, the edge node at the base station 110, upon which the cloud gaming proxy 114 is to be deployed, has an IP address. The IP address of the edge node can be obtained using the base station identifier 300, such as by accessing a lookup table to determine the IP address. Then the cloud gaming system 100 can communicate to the IP address of the edge node, and the edge node can communicate to the IP address of the client.

It will be appreciated that if the user equipment 122 switches to a different base station, then that base station will also have a unique base station identifier, which can be communicated back to the cloud gaming system so that the cloud gaming proxy can be redeployed to the new base station. In this manner, the cloud gaming proxy can be maintained at the base station that is nearest to and being used by the user equipment 122.

Generally speaking, it is expected that the cloud gaming proxy 114 will be a lightweight program, Acquiring a relatively small amount of code (e.g. less than 1 MB) to be deployed at the base station 110.

Broadly speaking, as the user engages in interactive game play of the cloud video game, the user may operate or interface with one or more controller devices to generate inputs for the video game. Merely by way of example without limitation, such devices can include one or more of a keyboard, mouse, touchpad, trackball, gaming controller, motion controller, joystick, buttons, trigger, camera, microphone, etc. In some implementations, the inputs generated from operation of such controller devices are communicated back to the cloud video game via the cloud gaming proxy 114. However, in other implementations, the inputs are communicated to the cloud video game separately from the cloud gaming proxy 114, such as through an alternate data channel.

In some implementations, the cloud gaming proxy is configured to buffer up to approximately 100 milliseconds of data; in some implementations, approximately 10 to 50 milliseconds worth of data (e.g. video data); in some implementations, approximately 20 to 30 milliseconds of data. For example, for a 1080p video stream of about 10 Mbit/second, then such may entail buffering up to about 0.1 MB of data, or for a 4K video stream of about 50 Mbit/second, then buffering up to about 0.6 MB of data.

Figure 4:
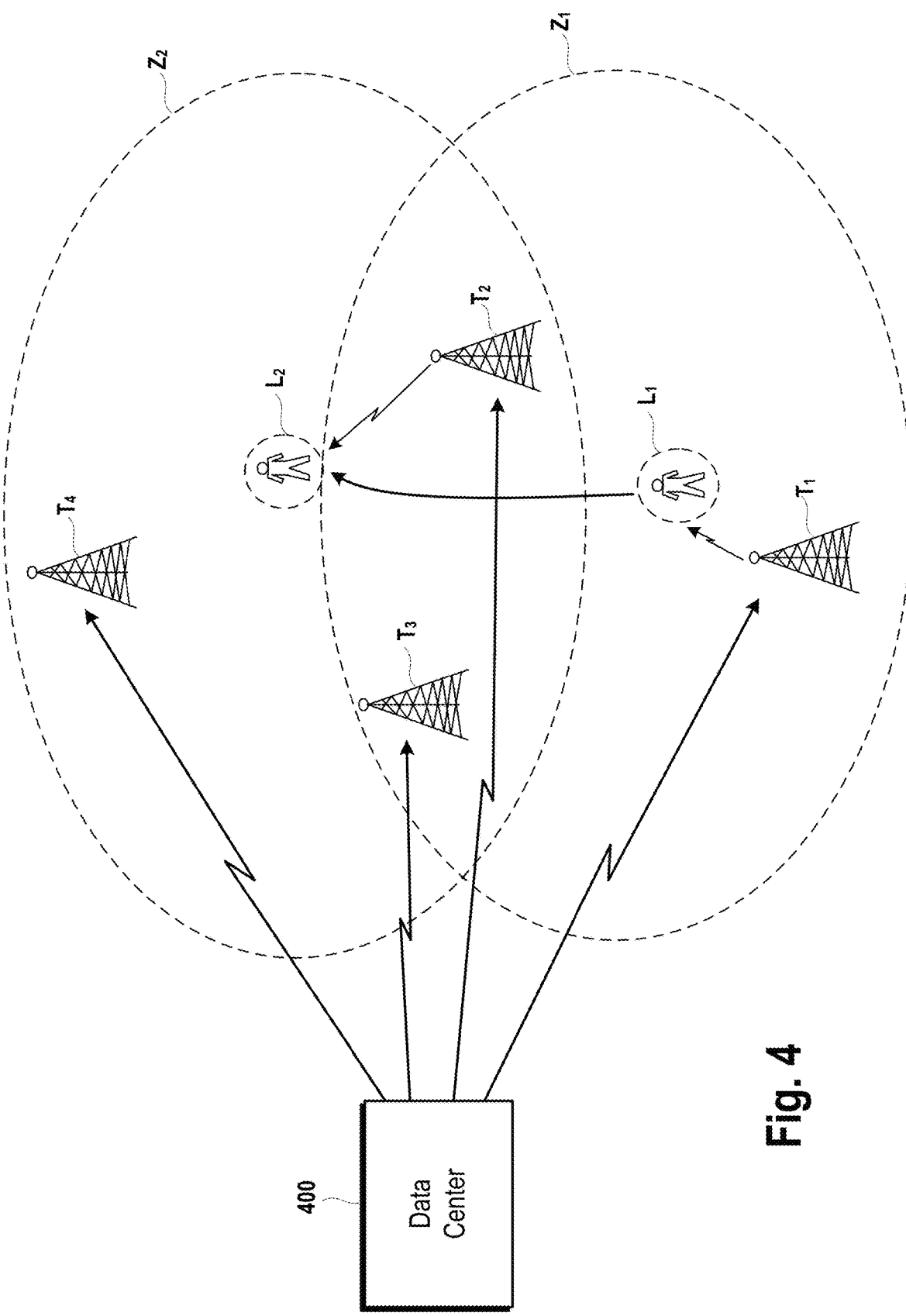
FIG. 4 conceptually illustrates migration of a cloud gaming proxy between different base stations, in accordance with implementations of the disclosure.

FIG. 4 conceptually illustrates migration of a cloud gaming proxy between different base stations, in accordance with implementations of the disclosure. In the Illustrated implementation, at an initial time point, a user at a location L1 may be streaming a cloud video game from a data center 400 through a local cellular tower (or base station) T1. That is, the user equipment that is being operated by the user to access and stream the cloud video game is positioned at the location L1 and connecting through the tower T1 for data communication. Accordingly, a cloud gaming proxy is deployed at the tower T1 to enable buffering of the video stream at the tower T1.

However, it may become necessary to switch towers due to circumstances such as tower T1 becoming too busy (e.g. too many users accessing tower T1, so that bandwidth available for the user is reduced), or the user moving to a different location. For example, the user may switch from accessing tower T1 to accessing tower T2. In such a case the cloud gaming proxy is migrated from the tower T1 to the tower T2. For example, when the user equipment switches from using tower T1 to using tower T2, then the base station identifier of the tower T2 is communicated to the data center 400, and the cloud gaming proxy is migrated or redeployed to the tower T2. In some implementations, the cloud gaming proxy is redeployed from the data center and instantiated anew at the tower T2. In some implementations, the cloud gaming proxy is copied or moved from tower T1 to tower T2. That is, in some implementations, the cloud gaming proxy at tower T1 instantiates another cloud gaming proxy at tower T2.

In some implementations, existing buffer data is transferred from the tower T1 to the tower T2, whereas in other implementations, buffer data is not transferred. In some implementations, gameplay is paused during migration or redeployment of the cloud gaming proxy. That is, when migration of the cloud gaming proxy occurs, a signal is sent to the cloud video game to pause the execution thereof. In some implementations, a pause or interruption screen or other notice can be shown when this occurs. In some implementations, the user can be presented with a selectable option to resume gameplay when the migration of the cloud gaming proxy is complete and the system is ready to resume game streaming.

However, it is generally desirable to avoid interruptions in gameplay if possible, and thus in some implementations, to avoid interruption of the video game, the instantiation of the cloud gaming proxy at tower T2 can occur prior to the user equipment switching from tower T1 to tower T2. Thus, for a certain period of time, the data center may stream data to both towers T1 and T2, even though the user equipment is still connected to tower T1. Then when the user equipment switches to tower T2 (and accordingly switches to using the cloud gaming proxy at tower T2), there is no interruption in the game streaming, for the data is already being streamed to the tower T2, in synchronization with that which was streamed to tower T1.

It will be appreciated that the cloud gaming proxy can be preemptively instantiated at nearby towers in accordance with the above, based on several factors. By way of example without limitation, such factors can include bandwidth or streaming quality. For example, if packet loss or data loss exceeds a given threshold, or video stream quality falls below a certain threshold, then the cloud gaming proxy can be preemptively instantiated at a nearby tower.

Another factor is location of the user equipment. For example, when the user is at location L1 in the illustrated implementation, and connected to tower T1, the user can be assigned a zone of towers Z1 that are proximate to the user's location. The cloud gaming proxy can be redundantly deployed at the towers in the user's zone. In the illustrated implementation, the zone Z1 includes towers T1, T2, and T3, and thus when the user is at location L1 and streaming gameplay through tower T1 specifically, the cloud gaming proxy is also redundantly deployed at towers T2 and T3. By way of example without limitation, in some implementations, the zone of towers may include any towers within a predefined radius of the user equipment's location.

With continued reference to FIG. 4, when the user moves to location L2, then the user may be assigned a different zone of towers Z2, which includes towers T2, T3, and T4. It will be appreciated that the user now accesses tower T2, and the transition is seamless because the cloud gaming proxy was already deployed at tower T2 prior to movement of the user to location L2. By actively deploying the cloud gaming proxy in a redundant manner in the background, then smooth and uninterrupted game streaming can be maintained even as the user equipment switches from one cell tower to another.

In some implementations, the movement or trajectory of the user can be tracked, and used accordingly to determine which towers on which to deploy the cloud gaming proxy. For example, the future position of the user can be predicted based on the user's current movement or trajectory, and towers which are proximate to the predicted future position can be identified and the cloud gaming proxy preemptively deployed thereon. In some implementations, GPS tracking or other tracking technologies can be used to determine the location and movements of the user equipment.

In some implementations, the user equipment can conduct ping tests or communication tests to local cell towers, to determine the signal strength to the local towers, latency, bandwidth or other network related factors that may affect streaming quality. The results of such tests can be communicated back to the data center 400, and utilized by the cloud gaming system to select towers for deployment of the cloud gaming proxy. Such information can be useful for selecting which tower is optimal, as the nearest tower geographically may not necessarily be the one that provides the best network condition for game streaming (e.g. due to obstruction, interference, etc.).

Thus in accordance with implementations of the disclosure, the video game can be streamed in parallel to multiple towers. The streamed data will have the same frame identifiers or audio packet identifiers, and the client could receive data from multiple towers, and then decide to switch over to another tower based on improved performance (e.g. lower latency), or may in fact decide not to switch towers if there is no improvement in performance or if doing so would actually degrade performance (e.g. increased latency).

In some implementations, tower usage can be based on service tiers/levels, either with respect to the network service provider or the cloud gaming provider. For example, users with a higher tier of service may have higher priority for the usage of a given cell tower, such as a nearest cell tower. That is, their game streams and cloud gaming proxies will be prioritized over those with a lower service tier. Users with a lower service tier will have lower priority for use of the cell tower, and may have their streaming quality downgraded or may be shifted to another tower when there is insufficient bandwidth through the given cell tower.

Figure 5:
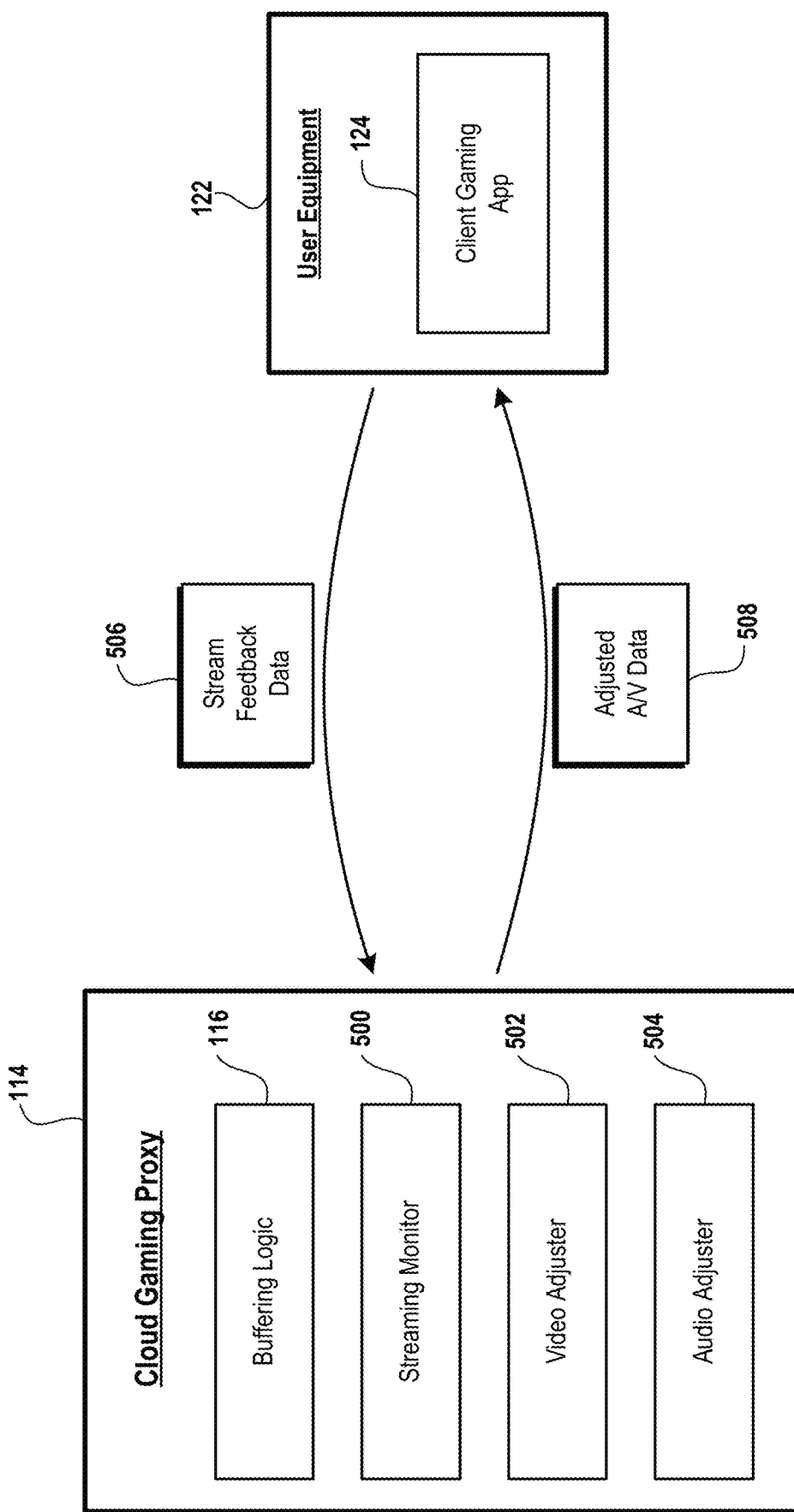
FIG. 5 conceptually illustrates a cloud gaming proxy configured to adjust the video or audio quality of a game stream, in accordance with implementations of the disclosure.

FIG. 5 conceptually illustrates a cloud gaming proxy configured to adjust the video or audio quality of a game stream, in accordance with implementations of the disclosure.

In some implementations, the cloud gaming proxy 114 can include a video adjuster 502 configured to adjust the video stream as needed based on changing network conditions. For example, the user may be initially connected to a given cell tower and streaming in 4K. However, the user may switch to a tower that can only handle 720$p$ streaming. In some implementations, the video adjuster 502 of the cloud gaming proxy is configured to downsample or transcode the video to suit the capabilities of the available network conditions, that is, changing the video to a format or setting that requires less bandwidth. For example, the video can be downsampled to 720$p$ by the cloud gaming proxy 114, prior to being transmitted to the user equipment. In some implementations, video that has been downsampled can be handled by the client by applying different settings. For example, the client gaming app 124 may apply upscaling to video that has been downsampled by the cloud gaming proxy.

Similarly, the audio portion of the video can be adjusted by an audio adjuster 504 of the cloud gaming proxy 114 based on network conditions. For example, audio can be adjusted or mixed down from 5.1 surround sound to stereo or mono audio. That is, the audio can be changed to a lower bandwidth format or setting.

It will be appreciated that such adjustment can be performed based on detecting the quality of the game streaming by a streaming monitor 500. For example, stream feedback data 506 can be transmitted to the streaming monitor 500, indicating the quality of the game stream. By way of example without limitation, if packet or data loss at the user equipment 122 exceeds a threshold, then the streaming monitor 500 may trigger the video adjuster 502 and/or audio adjuster 504 to downsample or otherwise adjust the video or audio streams so as to require less bandwidth. In some implementations, detection of such conditions can occur at the cloud gaming proxy level. For example, in some implementations, the streaming monitor 500 may monitor requests for retransmittal from the client gaming app 124, and if the cloud gaming proxy receives requests for retransmittal of packets/data at a rate that exceeds a predefined threshold, then this may indicate low connection quality, and thus the video adjuster 502 and/or audio adjuster 504 may be invoked to adjust the video/audio streaming to reduce bandwidth requirements. The adjusted audio/video data 508 is transmitted to the client gaming app 124, and is processed accordingly for rendering by the user equipment 122.

In some implementations, the cloud gaming proxy deployed at the edge compute is a temporary process. For example, the edge compute at the cell tower may be rented on an as-needed basis, and the cloud gaming proxy is therefore instantiated when needed, and terminated when no longer needed. In some implementations, the cloud gaming proxy is assigned a lifetime that depends on a signal from the client, such that if no signal is received from the client for a predefined amount of time, then the process is terminated.

Implementations of the present disclosure can be included as part of a game engine. Broadly speaking, a game engine is a software-development framework providing features that enable efficient development of video games. A game engine can include a software library with reusable modules to handle various aspects of game functionality, including by way of example without limitation, graphics rendering (e.g. including vertex processing, polygon processing, shading, lighting, texturing, etc.), sound, physics (including collision handling), animation, scripting, artificial intelligence, networking, streaming, memory management, threading, localization support, scene graph, cinematics, etc.

Game engines can be optimized for different hardware platforms, such as game consoles, mobile devices, personal computers, etc. By way of example without limitation, a game engine may optimize memory use depending upon the platform (e.g. how to prioritize various tasks in the graphics pipeline, etc.). In some implementations, the hardware may be a bladed version of some specific processing entity, such as a game console. Thus, a user may be assigned to a specific blade, which gives the same hardware that a console game has been optimized for.

It will be appreciated that there can also be game server logic to provide streaming and/or other services (packetizing, encoding, quality of service (QOS) monitoring, bandwidth testing, access to social network/friends, etc.)

In some implementations, a cloud infrastructure may run a hypervisor, which abstracts the hardware and provides a virtual machine framework, upon which an operating system (OS) can be loaded. Thus, a stack may include the application/video game, running on an OS, which is loaded on a virtual machine (VM) instantiated by the hypervisor, which is loaded on underlying hardware. In this manner, the execution of the application is not necessarily coupled to specific hardware.

In some implementations, an application/video game may execute over a container, which abstracts at the application layer, packaging code and dependencies together, thus enabling software development agnostic of OS or hardware platform, and facilitating software portability across platforms.

In some implementations, a distributed game engine is employed wherein different parts of the game engine can be can be handled by different compute entities. For example, the functionality of the game engine such as physics engine, rendering engine (2D/3D graphics), sound, scripting, animation, AI, networking, streaming (encoding), memory management, threading, etc. can be divided into different functional processing blocks and/or services that are distributed among many different computes. It will be appreciated that for a distributed game engine, low-latency communication is required to avoid latency issues. To maintain desired frame rates, total time of computes and communication should meet certain constraints. Thus, it may or may not be efficient to divide certain tasks depending upon whether it is possible to complete the process in shorter time.

An advantage of using a distributed game engine is that it is possible to take advantage of elastic computing, wherein computing resources can be scaled up or down depending upon needs. For example, in a large multiplayer game executed traditionally on a single hardware server, after for example about 100 players, hardware resources become limited, so that more players cannot be added. The game may queue additional players, meaning that players must wait to join the game. However, with a distributed game engine, by using elastic cloud computing resources, more compute nodes can be added to meet demand, thus enabling for example thousands of players. The game is no longer constrained by the limits of a particular hardware server.

Thus, a cloud game engine can have functionality distributed to different processing entities. It will be appreciated that different functions can be executed in different frameworks. For example, some functions (e.g. social) might be easier to run in a container, whereas graphics might be better run using a VM connected to a GPU.

To facilitate distribution of the functionality of a cloud game engine, a distribution/synchronization layer can manage distribution of jobs, e.g. sending jobs out, receiving data back, identifying what tasks are performed and when, handling queueing e.g. if a job is finished faster than needed. In some implementations a given task could be dynamically subdivided if needed. For example, animation could have lighting, and if the lighting is especially complex, the lighting could be subdivided into three lighting jobs that are sent out for computing and reassembled upon return. Thus game engine functions can be subdivided if they require more work.

Cloud service providers provide computes at specified performance levels, for example in input/output operations per second ("IOPS"). Thus, a gaming provider may specify VMs, dedicated processing power, amount of memory, etc. from a cloud service provider and instantiate a distributed cloud gaming engine using the cloud service provider's systems.

In some implementations the library module and update handler can be one or more components or modules of a game engine. In some implementations, the library module and update handler can be separate components, or integrated. In some implementations the library module and update handler may operate as an addition to a game engine. In some implementations the game engine can be a distributed game engine, as noted above.

As noted, implementations of the disclosure can be applied to cloud gaming systems. One example of a cloud gaming system is the Playstation® Now cloud gaming system. In such a system, the client device can be a game console, such as a Playstation® 4 game console, or may be another device such as a personal computer, laptop, tablet, cell phone, mobile device, etc.

Broadly speaking, to enable cloud gaming, several operations are performed by one or more servers within a data center associated with a cloud gaming site when a user request is received for a game title. When the cloud gaming site receives a user request, a data center hosting the game associated with the selected game title is identified and the request is sent to the identified data center for instantiating the game for the selected game title. In response to the request, a server at the data center identifies the game code, loads the identified game code and initializes the files related to the game code in preparation for presenting the game content to the user. Game data associated with a game can include generic game data and user specific game data. Therefore, initializing the files can include identifying, loading, and initializing both generic game data and user specific game data. Initializing generic game data may include initializing a graphics engine, installing graphics data, initializing sound files, installing art work, etc. Initializing user specific game data may include locating, transferring, and installing user data, user history, game history, etc.

While the generic game data is being loaded and initialized, a "splash" screen may be provided for rendering at the client device. A splash screen may be designed to provide representative images of the game that is being loaded, to allow a user a preview of the type of game that is being loaded. Once the generic game data is loaded, certain initial content may be rendered and a selection/navigation screen may be presented for user selection and customization. User selection input provided at the selection/navigation screen may include game level selection, game icon(s) selection, game mode selection, game winnings, and other user-related data that may require uploading of additional game content. In some embodiments, game content is made available by streaming the game content from the game cloud system to a user's computing device for viewing and interacting. In some implementations, after loading user specific data, the game content is available for game play.

Figure 6A:
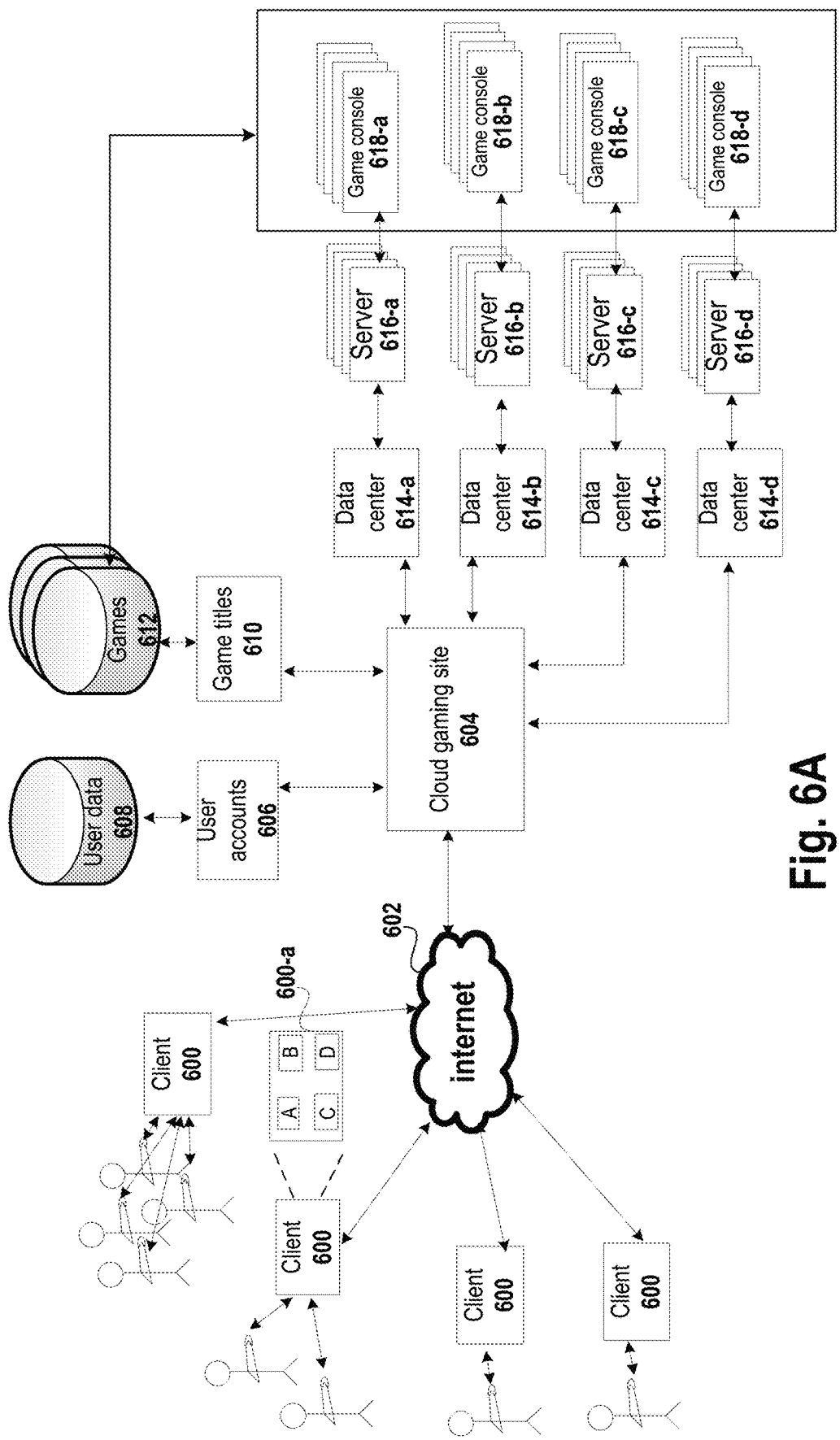
FIG. 6A illustrates an exemplary system used to load game files for a game available through a cloud gaming site, in accordance with implementations of the disclosure.

FIG. 6A illustrates an exemplary system used to load game files for a game available through a cloud gaming site. The system includes a plurality of client devices 600 that are communicatively connected to the cloud gaming site 604 over a network 602, which can include a LAN, wired, wireless, cellular (e.g. 4G, 5G, etc.), or any other type of data network, including the Internet. When a request to access the cloud gaming site 604 is received from a client device 600, the cloud gaming site 604 accesses user account information 606 stored in a user data store 608 to identify a user associated with a client device through which the request is initiated. In some embodiments, the cloud gaming site may also validate the identified user in order to determine all the games the user is authorized to view/play. Following user account identification/validation, the cloud gaming site accesses a game titles data store 610 to identify the game titles that are available at the game cloud site for the user account initiating the request. The game titles data store 610, in turn, interacts with a games database 612 to obtain the game titles for all the games that are available for the cloud gaming site. As new games are introduced, the games database 612 will be updated with the game code and the game titles data store 610 will be provided with game titles information for the newly introduced games. The client device from where the request is initiated may or may not be registered with the cloud gaming site, when the request was initiated. If the user of the client device initiating the request is not a registered user, then the cloud gaming site may identify the user as a new user and select the game titles (for e.g., a default set of game titles) that are appropriate for a new user. The identified game titles are returned to the client device for presenting on a display screen 600-*a*, as shown in FIG. 6A.

User interaction at one of the game titles rendered on the client device is detected and a signal is sent to the cloud gaming site. The signal includes the game title information where the user interaction was detected and the user interaction registered at the game title. In response to the signal received from the client device, the cloud gaming site proactively determines a data center where the game is being hosted and sends a signal to the identified data center to load the game associated with the game title for which the user interaction is detected. In some embodiments, more than one data center may be hosting the game. In such embodiments, the cloud gaming site may determine the geo location of the client device initiating the request and identify a data center that is geographically close to the client device and signal the data center to pre-load the game. The geo location of the user may be determined using a Global Position System (GPS) mechanism within the client device, the client's IP address, the client's ping information, to name a few. Of course, the aforementioned ways to detect the geo location of the user may be exemplary and other types of mechanisms or tools may be used to determine the geo location of the user. Identification of a data center that is close to the client device can minimize latency during user interaction with the game. In some embodiments, the identified data center may not have the required bandwidth/capacity to host the game or may be overused. In these embodiments, the cloud gaming site may identify a second data center that is geographically close to the client device. The loading of the game includes loading game code and executing an instance of the game.

In response to receiving the signal from the cloud gaming site, the identified data center may select a server at the data center to instantiate the game on the server. The server is selected based on the hardware/software capabilities available and the game requirements. The server may include a plurality of game consoles and the server may determine which one of the plurality of game consoles to use to load the game. The game console may be similar to an independent game console, or may be a rack-mounted server or a blade server. The blade server, in turn, may include a plurality of server blades with each blade having required circuitry for instantiating a single dedicated application, such as the game. Of course, the game console described above is exemplary and should not be considered restrictive. Other types of game consoles, including game stations, etc., and other forms of blade server may also be engaged for hosting the identified game.

Once the game console is identified, the generic game-related code for the game is loaded onto the game console and a signal is returned to the client device via the cloud gaming site over the network identifying the game console on which the game is instantiated. The loaded game is thus made available to the user.

Figure 6B:
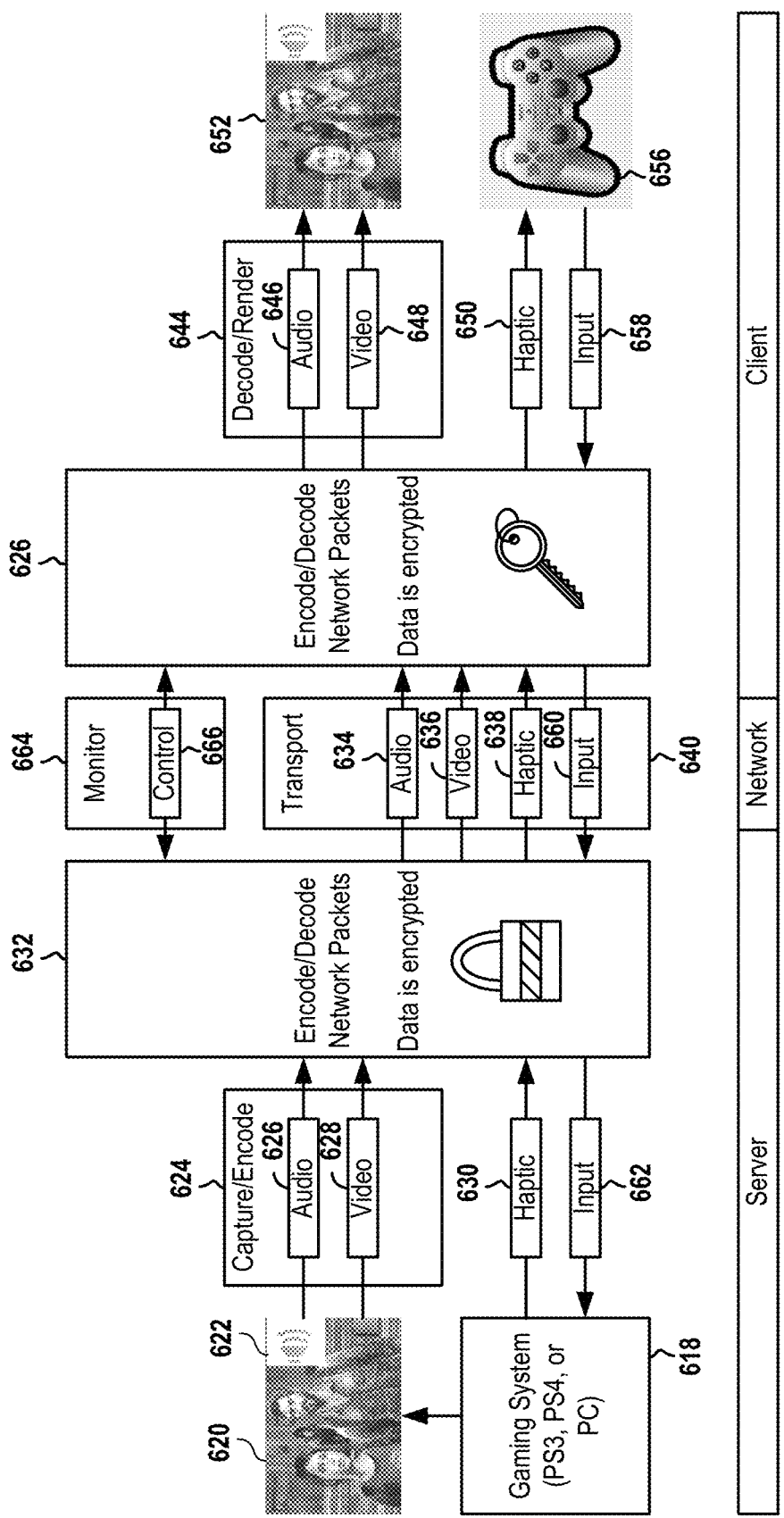
FIG. 6B is a flow diagram conceptually illustrating various operations which are performed for streaming a cloud video game to a client device, in accordance with implementations of the disclosure.

FIG. 6B is a flow diagram conceptually illustrating various operations which are performed for streaming a cloud video game to a client device, in accordance with implementations of the disclosure. The gaming system 618 executes a video game and generates raw (uncompressed) video 620 and audio 622. The video 620 and audio 622 are captured and encoded for streaming purposes, as indicated at reference 624 in the illustrated diagram. The encoding can provide for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

The encoded audio 626 and encoded video 628 are further packetized into network packets, as indicated at reference numeral 632, for purposes of transmission over a network such as the Internet. The network packet encoding process can also employ a data encryption process, thereby providing enhanced data security. In the illustrated implementation, audio packets 634 and video packets 636 are generated for transport over the network, as indicated at reference 640.

The gaming system 618 additionally generates haptic feedback data 630, which is also packetized into network packets for network transmission. In the illustrated implementation, haptic feedback packets 638 are generated for transport over the network, as further indicated at reference 640.

The foregoing operations of generating the raw video and audio and the haptic feedback data, encoding the video and audio, and packetizing the encoded audio/video and haptic feedback data for transport are performed on one or more servers which collectively define a cloud gaming service/system. As indicated at reference 640, the audio, video, and haptic feedback packets are transported over a network, such as and/or including the Internet. As indicated at reference 642, the audio packets 634, video packets 636, and haptic feedback packets 638, are decoded/reassembled by the client device to define encoded audio 646, encoded video 648, and haptic feedback data 650 at the client device. If the data has been encrypted, then the network packets are also decrypted. The encoded audio 646 and encoded video 648 are then decoded by the client device, as indicated at reference 644, to generate client-side raw audio and video data for rendering on a display device 652. The haptic feedback data 650 can be processed/communicated to produce a haptic feedback effect at a controller device 656 or other interface device through which haptic effects can be rendered. One example of a haptic effect is a vibration or rumble of the controller device 656.

It will be appreciated that a video game is responsive to user inputs, and thus, a similar procedural flow to that described above for transmission and processing of user input, but in the reverse direction from client device to server, can be performed. As shown, a user operating controller device 656 may generate input data 658. This input data 658 is packetized at the client device for transport over the network to the cloud gaming system. The input data packets 660 are unpacked and reassembled by the cloud gaming server to define input data 662 on the server-side. The input data 662 is fed to the gaming system 618, which processes the input data 662 to update the game state of the video game.

During transport (ref. 640) of the audio packets 634, video packets 636, and haptic feedback packets 638, the transmission of data over the network can be monitored to ensure the cloud game stream quality of service. For example, network conditions can be monitored as indicated by reference 664, including both upstream and downstream network bandwidth, and the game streaming can be adjusted in response to changes in available bandwidth. That is, the encoding and decoding of network packets can be controlled based on present network conditions, as indicated by reference 666.

Figure 7:
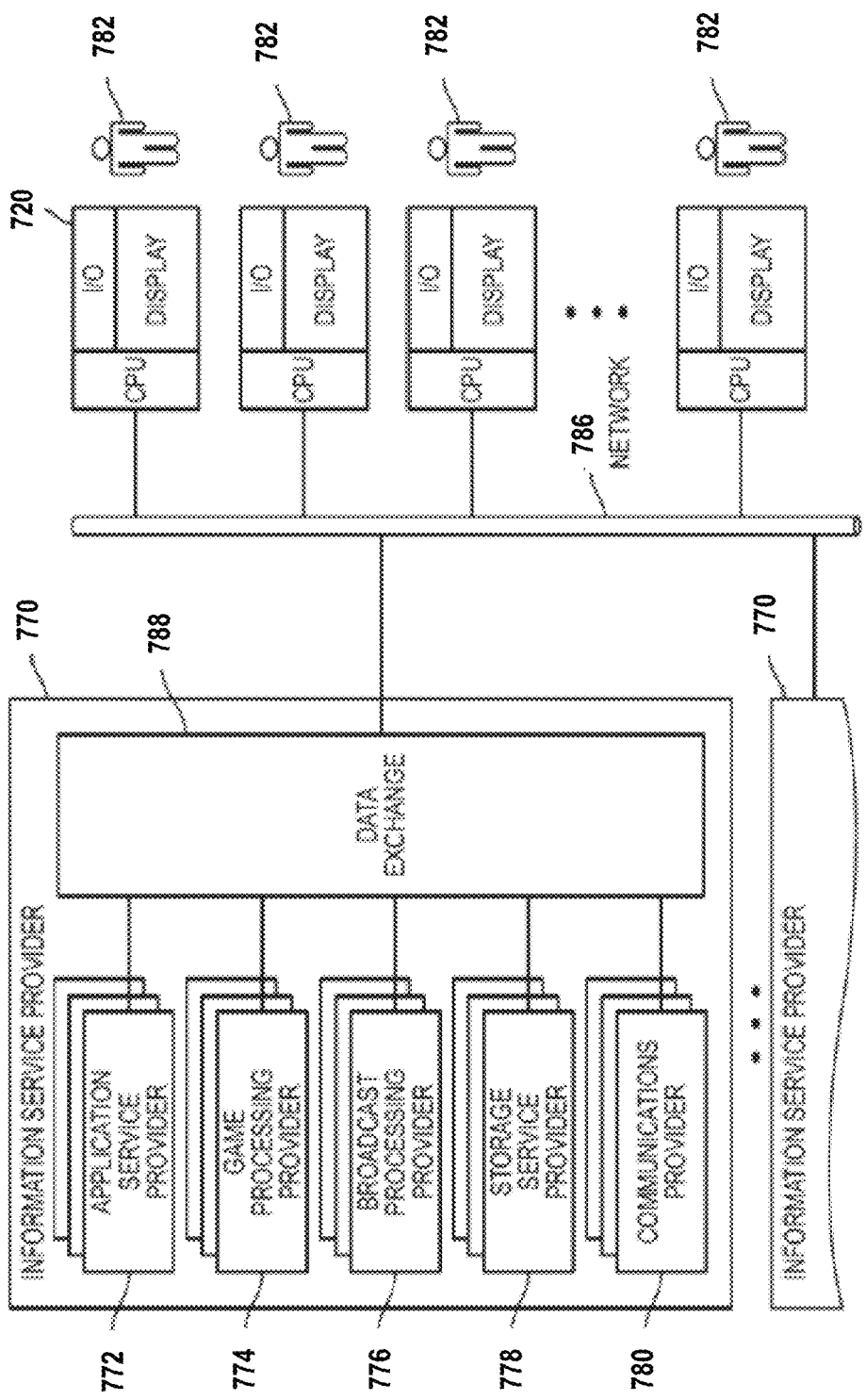
FIG. 7 illustrates an embodiment of an Information Service Provider architecture, in accordance with implementations of the disclosure.

FIG. 7 illustrates an embodiment of an Information Service Provider architecture. Information Service Providers (ISP) 770 delivers a multitude of information services to users 782 geographically dispersed and connected via network 786. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In another embodiment, the data is transferred from one ISP to another ISP as the client moves around the world to make the ISP in better position to service the user be the one that delivers these services.

ISP 770 includes Application Service Provider (ASP) 772, which provides computer-based services to customers over a network (e.g. including by way of example without limitation, any wired or wireless network, LAN, WAN, WiFi, broadband, cable, fiber optic, satellite, cellular (e.g. 4G, 5G, etc.), the Internet, etc.). Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet (e.g., using servers, storage and logic), based on how the Internet is depicted in computer network diagrams and is an abstraction for the complex infrastructure it conceals.

Further, ISP 770 includes a Game Processing Server (GPS) 774 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 776 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 778 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 780 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, fiber, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 788 interconnects the several modules inside ISP 770 and connects these modules to users 782 via network 786. Data Exchange 788 can cover a small area where all the modules of ISP 770 are in close proximity, or can cover a large geographic area when the different modules are geographically dispersed. For example, Data Exchange 788 can include a fast Gigabit Ethernet (or faster) within a cabinet of a data center, or an intercontinental virtual area network (VLAN).

Users 782 access the remote services with client device 784, which includes at least a CPU, a memory, a display and I/O. The client device can be a PC, a mobile phone, a netbook, tablet, gaming system, a PDA, etc. In one embodiment, ISP 770 recognizes the type of device used by the client and adjusts the communication method employed. In other cases, client devices use a standard communications method, such as html, to access ISP 770.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. Alternately, the computer readable code may be downloaded from a server using the data exchange interconnects described above. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the described embodiments.

What is claimed is:

1. A method, comprising:
executing a cloud video game in a data center;
streaming video generated by the executing cloud video game over a network to a client device;
receiving a base station identifier of a base station to which the client device is connected;
responsive to receiving the base station identifier, then using the base station identifier to identify an edge compute that is substantially at the base station, and further responsive to identifying the edge compute using the base station identifier, then deploying a cloud gaming proxy to the edge compute that is substantially at the base station and proximate to the client device;
wherein streaming the video includes transmission of the video to the cloud gaming proxy, and wherein the cloud gaming proxy buffers the video and retransmits lost packets of the video to the client device.

2. The method of claim 1, wherein streaming the video, buffering the video, and retransmission of lost packets are performed in real-time, to enable real-time gameplay of the cloud video game.

3. The method of claim 1, wherein the retransmission of a given lost packet is in response to non-receipt of an acknowledgement, for the given lost packet from the client device, within a predefined time period after prior transmission of the lost packet.

4. The method of claim 1, wherein the retransmission of a given lost packet is in response to a request for the given lost packet from the client device.

5. The method of claim 1, wherein the edge compute is defined at a wireless base station that facilitates wireless communication with the client device.

6. The method of claim 5, wherein the wireless base station is a cellular base station or cellular tower that is a member of a cellular network.

7. The method of claim 5, further comprising:
deploying a second cloud gaming proxy to a second edge compute that is defined at a second wireless base station proximate to the wireless base station, the second cloud gaming proxy receiving and buffering the video;
responsive to detecting switching of the client device from connecting to the wireless base station to connecting to the second wireless base station, then activating the second cloud gaming proxy to retransmit lost packets of the video to the client device.

8. The method of claim 7, wherein the buffering of the video by the second cloud gaming proxy occurs simultaneously with the buffering of the video by the cloud gaming proxy prior to the switching of the client device from the wireless base station to the second wireless base station.

9. The method of claim 1, wherein the cloud gaming proxy tracks video frames of the video, and retransmits lost packets for a given video frame within a predefined time period after the video frame was transmitted to the client device, but does not retransmit lost packets for the given video frame after the predefined time period has elapsed since the given video frame was transmitted to the client device.

10. The method of claim 1, further comprising:
streaming audio generated by the executing cloud video game over the network to the client device;
wherein the cloud gaming proxy buffers the audio and retransmits lost packets of the audio to the client device.

11. The method of claim 1, wherein the base station identifier is received from the client device.

12. The method of claim 1, further comprising:
terminating the cloud gaming proxy when the video is no longer being transmitted to the cloud gaming proxy.

13. The method of claim 1, wherein the cloud gaming proxy adjusts a quality of the video based on a detected network condition.

14. A non-transitory computer readable medium having program instructions that, when executed by a computing device, cause said computing device to perform a method including the following:
executing a cloud video game in a data center;
streaming video generated by the executing cloud video game over a network to a client device;
receiving a base station identifier of a base station to which the client device is connected, wherein the wireless base station is a cellular base station or cellular tower that is a member of a cellular network;
responsive to receiving the base station identifier, then using the base station identifier to identify an edge compute that is substantially at the base station, and further responsive to identifying the edge compute using the base station identifier, then deploying a cloud gaming proxy to the edge compute that is proximate to the client device;
wherein streaming the video includes transmission of the video to the cloud gaming proxy, and wherein the cloud gaming proxy buffers the video and retransmits lost packets of the video to the client device;
wherein streaming the video, buffering the video, and retransmission of lost packets are performed in real-time, to enable real-time gameplay of the cloud video game.

15. The non-transitory computer readable medium of claim 14, wherein the retransmission of a given lost packet is in response to non-receipt of an acknowledgement, for the given lost packet from the client device, within a predefined time period after prior transmission of the lost packet.

16. The non-transitory computer readable medium of claim 14, wherein the retransmission of a given lost packet is in response to a request for the given lost packet from the client device.

17. The non-transitory computer readable medium of claim 14, wherein the edge compute is defined at a wireless base station that facilitates wireless communication with the client device.

18. The non-transitory computer readable medium of claim 17, further comprising:
deploying a second cloud gaming proxy to a second edge compute that is defined at a second wireless base station proximate to the wireless base station, the second cloud gaming proxy receiving and buffering the video;
responsive to detecting switching of the client device from connecting to the wireless base station to connecting to the second wireless base station, then activating the second cloud gaming proxy to retransmit lost packets of the video to the client device.

19. The non-transitory computer readable medium of claim 18, wherein the buffering of the video by the second cloud gaming proxy occurs simultaneously with the buffering of the video by the cloud gaming proxy prior to the switching of the client device from the wireless base station to the second wireless base station.

20. The non-transitory computer readable medium of claim 14, wherein the cloud gaming proxy tracks video frames of the video, and retransmits lost packets for a given video frame within a predefined time period after the video frame was transmitted to the client device, but does not retransmit lost packets for the given video frame after the predefined time period has elapsed since the given video frame was transmitted to the client device.

21. The non-transitory computer readable medium of claim 14, wherein the method further includes:
streaming audio generated by the executing cloud video game over the network to the client device;
wherein the cloud gaming proxy buffers the audio and retransmits lost packets of the audio to the client device.

22. The non-transitory computer readable medium of claim 14, wherein the base station identifier is received from the client device.

* * * * *